United States Patent [19]

Dubin et al.

[11] Patent Number: 5,816,859

[45] Date of Patent: Oct. 6, 1998

[54] SEPARABLE WIRE TERMINUS CONNECTOR MOUNTING ASSEMBLY SYSTEM FOR USE WITH COMPUTERS

[75] Inventors: Israel Dubin, Sugar Land; Robert Vu, Houston, both of Tex.

[73] Assignee: Texas Microsystems, Inc., Houston, Tex.

[21] Appl. No.: 729,585

[22] Filed: Oct. 11, 1996

Related U.S. Application Data

[60] Provisional application No. 60/005,205 Oct. 12, 1995.

[51] Int. Cl.⁶ .................................................. H01R 27/00
[52] U.S. Cl. .......................................... 439/638; 439/76.1
[58] Field of Search ................................... 439/638, 544, 439/76.1, 620

[56] References Cited

U.S. PATENT DOCUMENTS

| | | |
|---|---|---|
| 4,530,066 | 7/1985 | Ohwaki et al. . |
| 4,991,058 | 2/1991 | Watkins et al. . |
| 5,057,676 | 10/1991 | Komaki . |
| 5,097,388 | 3/1992 | Buist et al. . |
| 5,099,391 | 3/1992 | Maggelet et al. ...................... 439/76.1 |
| 5,117,378 | 5/1992 | Ho . |
| 5,217,394 | 6/1993 | Ho ......................................... 439/638 |
| 5,249,981 | 10/1993 | Abell et al. . |
| 5,282,114 | 1/1994 | Stone . |
| 5,331,506 | 7/1994 | Nakajima . |
| 5,400,215 | 3/1995 | Chung . |
| 5,423,605 | 6/1995 | Liu . |

*Primary Examiner*—Khiem Nguyen
*Assistant Examiner*—Eugene G. Byrd
*Attorney, Agent, or Firm*—Vinson & Elkins L.L.P.

[57] ABSTRACT

A system for customizing computers to mate with an array of wire or cable terminus connectors includes a detachable wire or cable terminus connector mounting assembly. The wire terminus connector mounting assembly includes a cover plate and an interfacing circuit board. The cover plate may be customized to present an array of selected computer-based connectors which are electrically connected to the computer by the interfacing circuit board which includes a standard connection array at a predetermined location.

7 Claims, 3 Drawing Sheets ns connector mounting assembly at a predetermined location. A corresponding predetermined location within the computer housing includes a compatible male connector to which the standard connection array is attached. Thus, by using a variety of different separable wire or cable terminus connector mounting assemblies, it is possible to connect the computer to a variety of different sizes and styles of wire or cable terminus connectors. Compatibility with the computer is attained by using a standard connection array in the same predetermined physical location with each separable wire terminus connector mounting assembly.

SEPARABLE WIRE TERMINUS CONNECTOR MOUNTING ASSEMBLY SYSTEM FOR USE WITH COMPUTERS

This application claims the benefit of U.S. Provisional Application No. 60/005,205 filed Oct. 12, 1995.

BACKGROUND

The present invention pertains to computers; more particularly, the present invention pertains to mounting provisions for connecting wires or cables to a computer.

Most computers receive input or provide outputs through a panel of male or female connectors. This panel typically includes an array of male or female connectors to which a variety of wire or cable terminus connectors are attached. In most applications, the connectors on the computer are female connectors, and the wire or cable terminus connectors are male connectors. Such wire-to-computer connections are specifically used to perform one or more of the following functions: (i) supply power to the computer; (ii) connect the computer to various ancillary or peripheral devices; (iii) connect the computer to other computers; or (iv) connect the computer to one or more data transmission systems.

Larger computers include a wide variety of female connectors which are typically called serial ports, parallel ports, monitor interfaces, floppy drive interfaces, etc. To be compatible with different types of equipment made by different manufacturers, large computers often include an array of different sizes and styles of connectors. However, smaller computers have only a limited space in which to provide an array of connectors or ports. Thus, if the array of connectors or ports on a computer is limited because of space considerations, it is necessary to use an adapter cable which extends from the connector or port on the computer to a wire or cable terminus connector.

While some adapter cables have been made available to mate wire or cable terminus connectors to the connectors or ports on a computer, adapter cables do not exist for all possible connections between wire and cable terminus connectors and female connectors or ports on computers. This lack of adapter cables is particularly troublesome when the computers are used with proprietary equipment designed for use in a single application or by a limited number of users.

There is, therefore, a need to provide a system by which a single computer can be used with a wide variety of wire or cable terminus connectors.

SUMMARY OF THE INVENTION

A system which provides for interconnection between a single computer and a wide variety of wire or cable terminus connectors includes using custom designed separable wire or cable terminus connector mounting assemblies. Each individual separable wire or cable terminus connector mounting assembly includes a substantially flat plate portion. The periphery of the substantially flat plate portion is physically engageable with an opening in the computer housing. Protruding through the substantially flat portion are a plurality of computer-based connectors that are physically compatible with the wire or cable terminus connectors to be connected to the computer. The computer-based connectors are electrically and physically connected to a circuit board which provides a standard connection array electrically and positionally compatible with the computer's internal circuitry. The standard connection array is a large female connector which is positioned on the separable wire termi- The foregoing invention provides for the customization of a standard computer to a variety of arrays of wire or cable terminus connectors. Such customization is particularly useful with limited use, small hand-held computers provided to repairmen or delivery personnel to record or provide specific types of information.

DESCRIPTION OF THE FIGURES

A better understanding of the present separable wire or cable terminus connector mounting system of the invention may be had by reference to the figures wherein.

DESCRIPTION OF THE EMBODIMENTS

Figure 1:
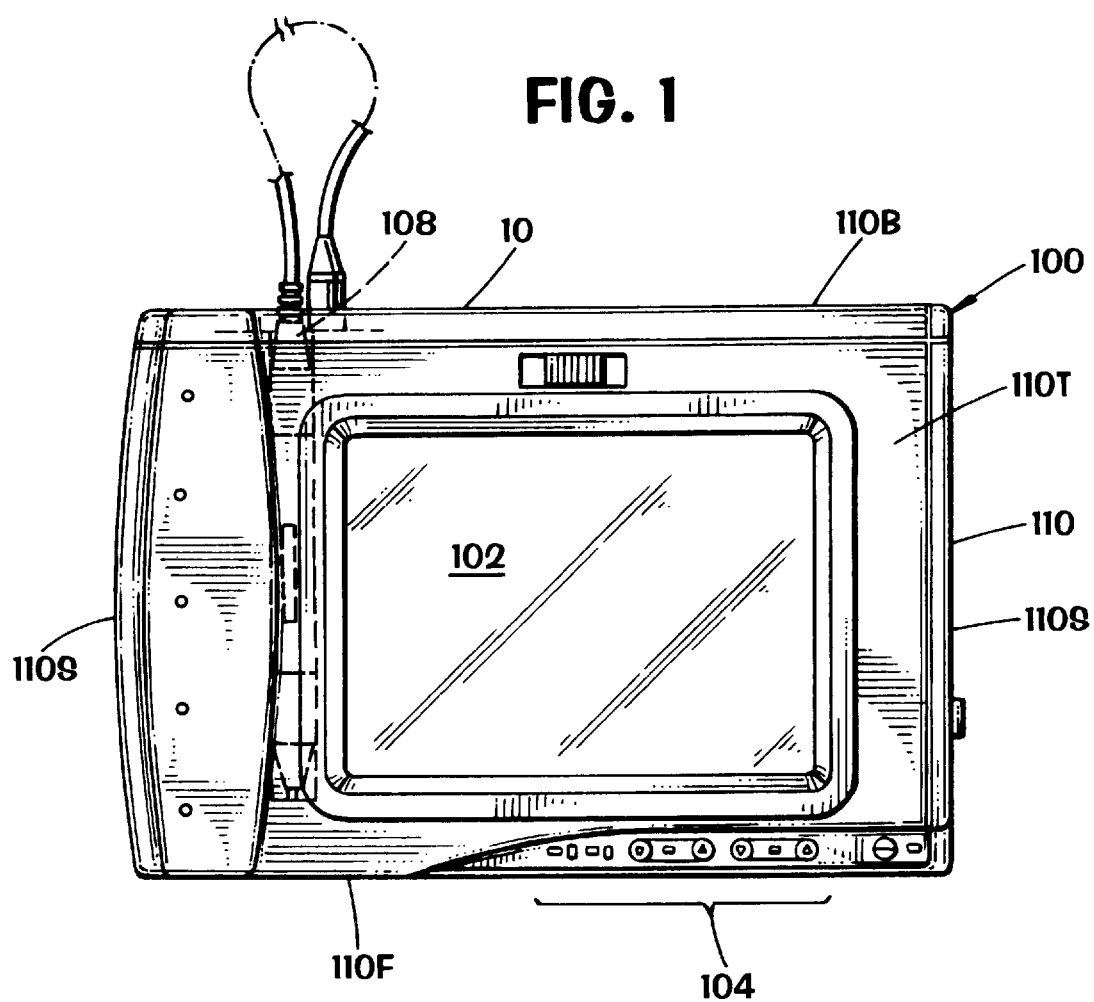
FIG. 1 is a top plan view of a hand-held computer including a separable wire terminus connector mounting assembly.
Figure 2:
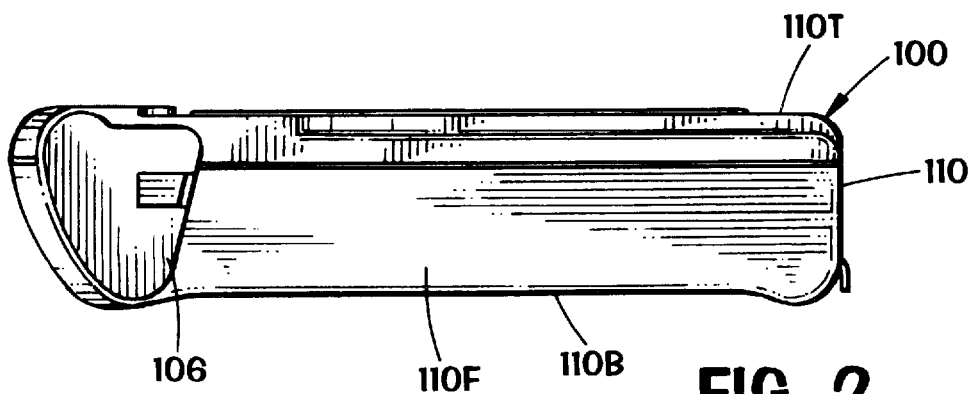
FIG. 2 is a front elevational view of the computer shown in FIG. 1.

The present invention is designed primarily for use with small hand-held computers 100, such as that shown in FIGS. 1 and 2. While the present invention appears to have its greatest utility with small hand-held computers, it will be understood by those of ordinary skill in the art that the present invention is usable with computers of any size.

Figure 3:
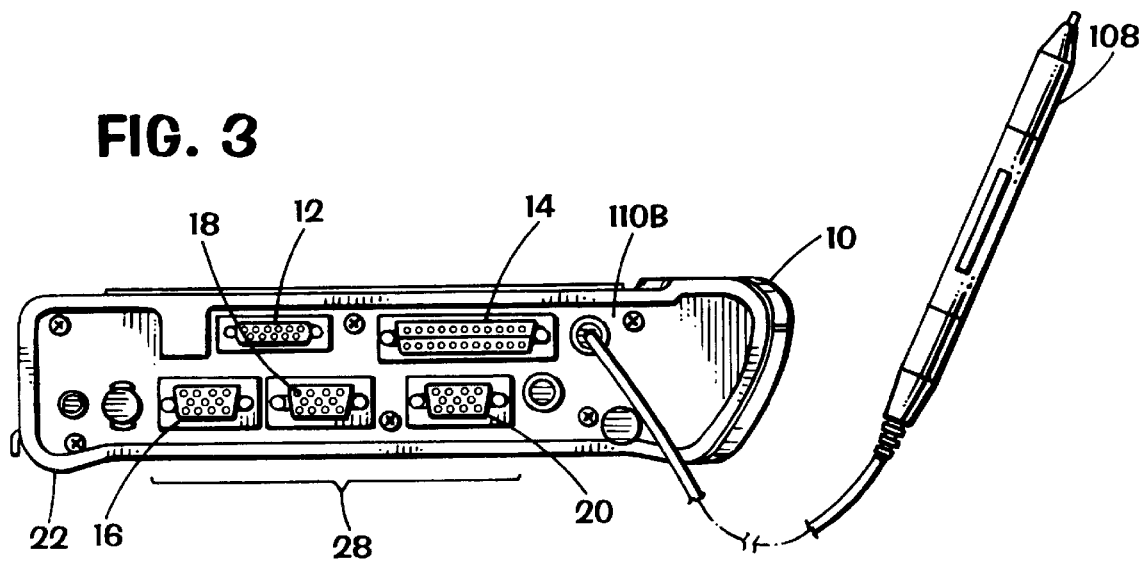
FIG. 3 is a rear elevational view of the computer shown in FIG. 1.

The computer 100 shown in FIGS. 1 and 2 includes a screen 102, an array of operating buttons 104, a battery compartment door 106, and a wand or pen 108. The wand or pen 108 may be used to touch various icons or symbols appearing on the screen 102. The computer is housed within a computer housing 110 which includes a top 110T, a bottom 110B, two sides 110S, and a front 110F. As shown in FIG. 3, the back surface 110B presents an array of the computer-based connectors or ports 28 designed for mating with various wire or cable terminus connectors.

Figure 6:
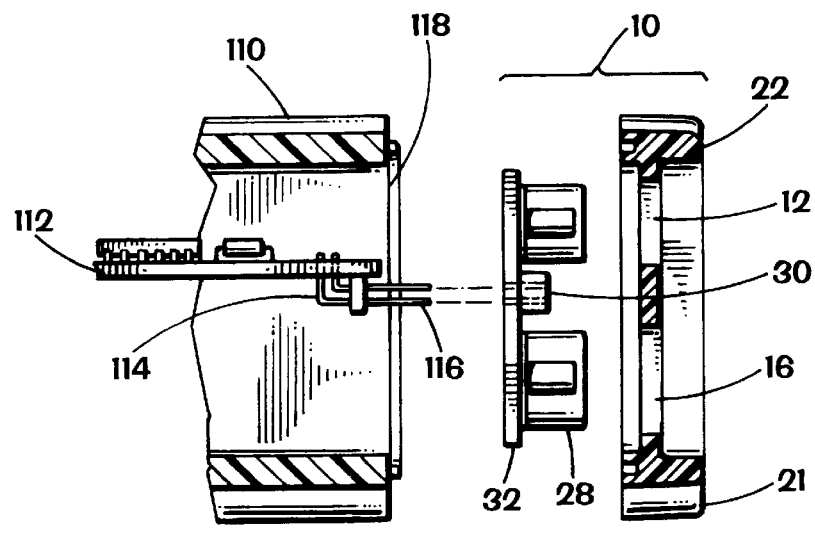
FIG. 6 is an enlarged, exploded view in partial section similar to FIG. 5, showing the separable wire terminus connector mounting assembly.
Figure 7:
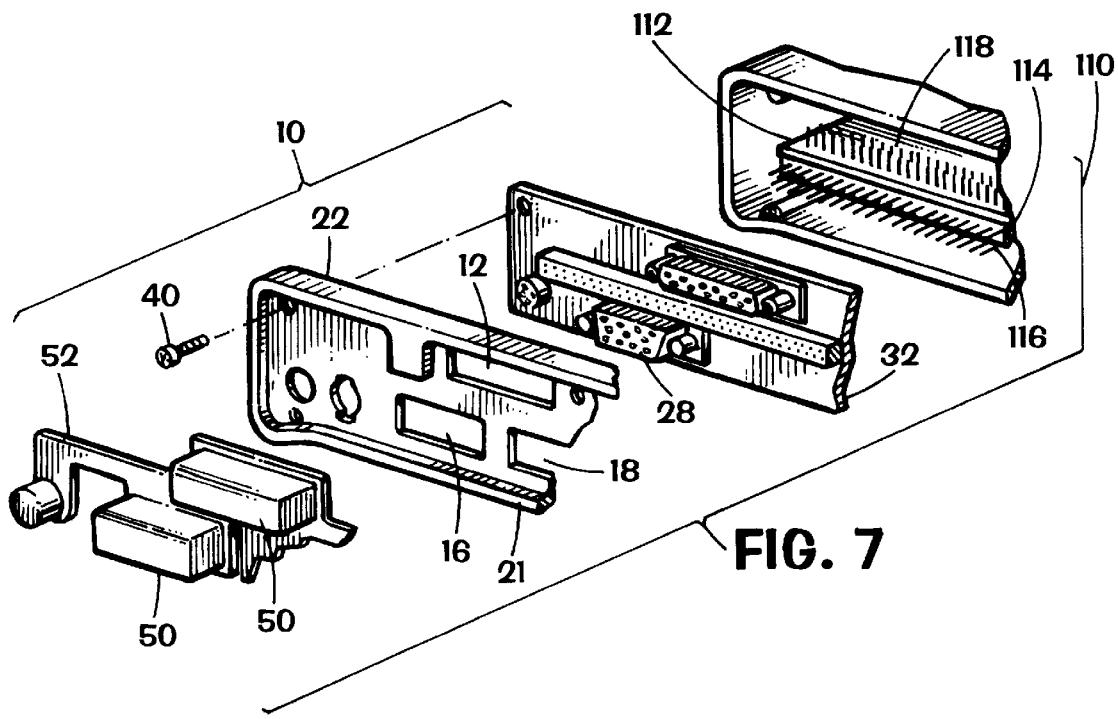
FIG. 7 is an exploded perspective view of the separable wire terminus connector mounting assembly.

As shown in FIGS. 6 and 7, at least one circuit board 112 is included within the computer housing 110. Mounted on the circuit board 112 is a pin connector holder 114 which positions a plurality of pins 116. The pins 116 are positioned to be in close proximity to the opening 118 formed in the back of the computer housing 110. By assuring that the pins 116 are in a predetermined physical location with respect to the opening 118, it is then possible to utilize a variety of different arrays of computer-based connectors 28. The only requirement is that the arrays of computer-based connectors 28 are electrically connected together so that they can engage the pins 116. Thus, by providing wide latitude in the arrays of computer-based connectors 28 that can be used, the system of the present invention includes one or more separable wire terminus connector mounting assemblies 10 which can be used with a single computer 100.

As may be seen in FIGS. 1, 5, 6 and 7, the back opening 118 of the computer 100 is covered by a separable wire or cable terminus connector mounting assembly 10. The separable wire or cable terminus connector mounting assembly 10 consists of two parts. The first part is a cover plate 21, and the second part is a circuit board 32. The distinguishing feature of the separable wire or cable terminus connector mounting assembly 10 is that it may be configured to include a variety of different computer-based connectors 28, for example, at various different holes 12, 14, 16, 18, 20. The number and size of the holes formed in the separable wire or cable terminus connector mounting assembly 10 are determined by the number, size and style of the wire or cable terminus connectors to be used with the computer 100.

The cover plate 21 of the separable wire or cable terminus connector mounting assembly 10 is bordered by a rim 22 which allows the separable wire or cable terminus connector mounting assembly 10 to blend aesthetically with the computer housing 110. A plurality of screws 40 connect the cover plate 21 to the circuit board 32. The separable wire or cable terminus connector mounting assembly 10 may be attached to the computer housing 110 using either fasteners or a snap-fit engagement.

Within the rim 22 which borders the cover plate 21 is a substantially flat plate portion 26. Protruding through the custom variety of holes 12–20 formed in the substantially flat plate portion 26 are the various computer-based connectors 28 which are selected to be compatible with the wire or cable terminus connectors to be connected to the computer 100 to allow it to perform the desired functions. For example, if the computer is being used as a diagnostic aid by a repairman, it will be necessary to enable connection with diagnostic program input devices as well as connectors on cables used with the equipment being diagnosed and eventually repaired based on the diagnosis. If the computer is used by delivery personnel, the array of connectors must enable the input and output of package delivery and customer data on a daily basis. In still other applications, the array of computer-based connectors 28 may be chosen to be compatible with standard wire or cable terminus connectors used in a variety of different countries.

The selected array of computer-based connectors 28 is mounted on a circuit board 32. The circuit board 32 provides an interface between the selected array of computer-based connectors 28 and the computer 100. This interface is accomplished by electrically connecting each individual computer-based connector 28 to a standard connection array 30 which is shown located on the outboard side of the circuit board 32. As shown in the preferred embodiment and in FIG. 6, the standard connection array 30 may be a plurality of female connections which engage the pins 116 which are mounted in a predetermined position on a circuit board 112 within the computer housing 110. In the preferred embodiment, the pins 116 extend through the circuit board 32 into the standard connection array 30. If desired, the illustrated female standard connection array 30 may be replaced by a plurality of male connectors which would then interconnect with female connectors located on the circuit board 112.

Figure 4:
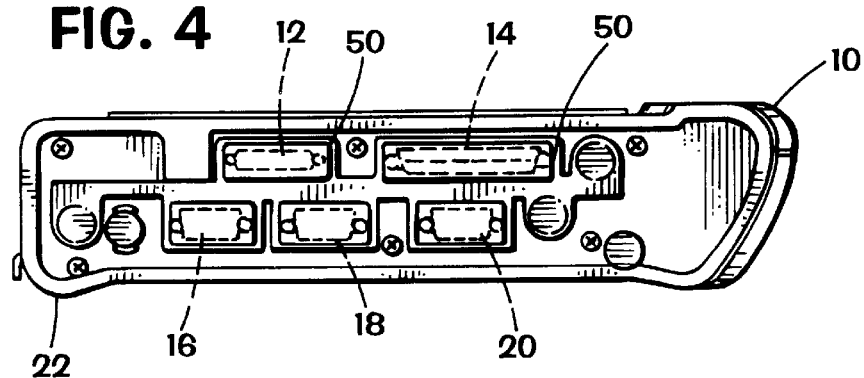
FIG. 4 is a rear elevational view similar to FIG. 3 but including optional dust and splash protection.
Figure 5:
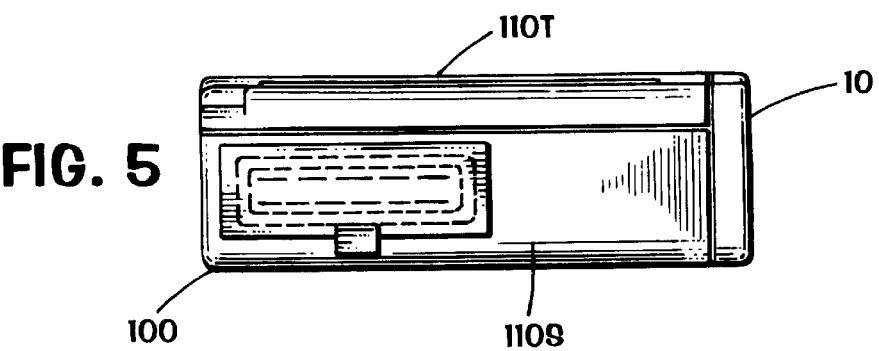
FIG. 5 is a side elevational view of the computer shown in FIG. 1.

As may be further seen by reference to FIGS. 4 and 7, the detachable wire or cable terminus connector mounting assembly 10 may optionally include a plurality of flexible rubber covers 50 which are positioned over the various holes in the cover plate 21. Such rubber covers 50 serve as a dust and splash shield for the connectors 28. It has been found that forming the rubber covers 50 so that they are cut on three sides and hingedly connected to a single web piece 52 provides for convenient mounting of the web piece 52 just under the cover plate 21. Each small, hinged cover then protrudes through a hole formed in the substantially flat plate portion 26.

There is thereby provided by the detachable wire or cable terminus connector mounting assembly 10 of the present invention a method for utilizing a computer with a wide variety of different wire or cable terminus connectors.

What is claimed:

1. A separable assembly for interconnecting at least one wire or cable terminus connector to a computer, said computer being mounted within a computer housing, said separable assembly comprising:

a substantially flat plate portion constructed and arranged to engage the computer housing;

a plurality of computer-based connectors compatible with at least one wire or cable terminus connector positioned with respect to said substantially flat plate portion;

a plurality of holes formed in said substantially flat plate portion to provide access to said plurality of computer-based connectors;

a standard connection array positioned on the side of said substantially flat plate facing the computer housing, said standard connection array being physically and electrically connected to each of said plurality of computer-based connectors; and means for attaching said substantially flat plate to the computer housing;

whereby differing arrays of at least one wire or cable terminus connector may be interconnected with the computer by attaching different separable assemblies to the computer housing and making electrical contact between the computer and said connection array.

2. The separable assembly as defined in claim 1 wherein at least one of said plurality of computer-based connectors compatible with said at least one wire or cable terminus connector is a female connector.

3. The separable assembly as defined in claim 1 wherein at least one of said plurality of computer-based connectors compatible with said at least one wire or cable terminus connector is a male connector.

4. The separable assembly as defined in claim 1 wherein said at least one hole is protected by a flexible dust and splash shield.

5. The separable assembly as defined in claim 1 wherein said standard connection array includes male connectors.

6. The separable assembly as defined in claim 1 wherein said standard connection array includes female connectors.

7. The separable assembly as defined in claim 1 further including mating circuitry interposed between said at least one computer-based connector and the computer.

* * * * *